United States Patent
Shang et al.

(10) Patent No.: US 8,751,441 B2
(45) Date of Patent: Jun. 10, 2014

(54) SYSTEM, METHOD, AND COMPUTER PROGRAM PRODUCT FOR DETERMINING SQL REPLICATION PROCESS

(75) Inventors: Heping Shang, Walnut Creek, CA (US); Elena Lora-Gallardo, Montrouge (FR); Andrzej Sarapuk, Argenteuil (FR)

(73) Assignee: Sybase, Inc., Dublin, CA (US)

( * ) Notice: Subject to any disclaimer, the term of this patent is extended or adjusted under 35 U.S.C. 154(b) by 829 days.

(21) Appl. No.: 12/183,505

(22) Filed: Jul. 31, 2008

(65) Prior Publication Data

US 2010/0030730 A1 Feb. 4, 2010

(51) Int. Cl.
*G06F 17/30* (2006.01)

(52) U.S. Cl.
USPC ............ 707/609; 707/610; 707/626; 707/628

(58) Field of Classification Search
CPC .............. G06F 17/30864; G06F 17/30991; G06F 17/30; G06F 17/3001; G06F 17/30595; G06F 17/30604; G06F 17/30873; G06F 19/16; G06F 21/568; G06F 3/0482; G06F 8/31; G06F 8/425; G06F 9/3889

USPC ................ 707/999.2, 609, 610, 626, 628
See application file for complete search history.

(56) References Cited

U.S. PATENT DOCUMENTS

| | | | | |
|---|---|---|---|---|
| 6,018,762 | A * | 1/2000 | Brunson et al. | 709/206 |
| 6,397,228 | B1 * | 5/2002 | Lamburt et al. | 707/692 |
| 2002/0143754 | A1 * | 10/2002 | Paulley et al. | 707/3 |
| 2003/0084075 | A1 * | 5/2003 | Balogh et al. | 707/204 |
| 2009/0024312 | A1 * | 1/2009 | Brinkman | 701/200 |
| 2009/0172123 | A1 * | 7/2009 | Ewing | 709/206 |

* cited by examiner

*Primary Examiner* — Shyue Jiunn Hwa
(74) *Attorney, Agent, or Firm* — Sterne, Kessler, Goldstein & Fox PLLC

(57) ABSTRACT

A system, method, and computer program product are provided for replicating a table in a source database to a target database. In accordance with an embodiment of the present invention, a subscription to the table is defined and a query is executed on the source database. The query is then normalized, and it is determined whether the query would cause semantically appropriate changes to the target database. If so, the normalized query is sent to the target database for execution, in accordance with an additional embodiment of the present invention.

21 Claims, 10 Drawing Sheets

SYSTEM, METHOD, AND COMPUTER PROGRAM PRODUCT FOR DETERMINING SQL REPLICATION PROCESS

CROSS-REFERENCE TO RELATED APPLICATIONS

The present application is related to U.S. patent application Ser. No. 12/183,794, filed Jul. 31, 2008, titled "Statement Categorization and Normalization", and U.S. patent application Ser. No. 12/183,843, filed Jul. 31, 2008 titled "Statement Logging in Databases", both of which are incorporated herein by reference in their entireties.

BACKGROUND OF INVENTION

1. Field of the Invention

The present invention relates generally to databases and, more specifically, to data replication.

2. Description of the Background Art

Data replication involves the copying and synchronization of data from a source database to one or more target databases. At present, data replication is commonly accomplished using log-based technology. Through the use of log-based replication, changes to the data source are captured in a transaction log. A replication process reads the transaction log and propagates the changes to target databases.

The data in a transaction log is not dependent on the execution context, instead providing information on what rows in what tables of a database have changed, as well as the new data contained in these rows. The replication process is able to instruct the target databases on the specific changes they need to make to the local copies of the changed tables in order to have an exact copy of the source data.

Log-based replication works well, in terms of latency, when transactions are small and any changes made involve few data rows. However, certain operations result in large transactions with changes to many data rows. For example, batch jobs or scheduled operations to the source database will often contain queries resulting in changes to thousands of data rows. Using log-based replication, each of these thousands of changes to the data rows must be applied to the target databases one at a time. The replication process is required to read and forward every atomic operation with its data to the target server, resulting in a costly log scanning effort and high network usage. Moreover, this results in a severe performance impact to the target databases as they work to apply the individual changes. Rather than executing the single source statement that was run on the source database, one statement for each affected row is run on the target database. This may lead to the target database suffering from asymmetric resource loading.

Accordingly, what is desired is a means for performing database replication with reduced overhead when processing high-impact transactions.

SUMMARY OF INVENTION

Embodiments of the invention include a method for replicating one or more tables to one or more target databases. The method includes the steps of defining a subscription to the one or more tables, executing a query on the source database, normalizing the query, determining whether the query would cause semantically appropriate changes to the target database, and sending the normalized query to the target database for execution, if the determining step determines that the query would cause semantically appropriate changes to the target database.

Additional embodiments of the invention include a system for replicating one or more tables to one or more target databases. The system includes a defining module for defining a subscription to the one or more tables, an executing module for executing a query on the source database, a normalizing module for normalizing the query, a determining module for determining whether the query would cause semantically appropriate changes to the target database, and a sending module for sending the normalized query to the target database for execution, if the determining module determines that the query would cause semantically appropriate changes to the target database.

Further embodiments of the invention include a computer program product comprising a computer-usable medium having computer program logic recorded thereon for enabling a processor to replicate one or more tables to one or more target databases. The computer program logic includes defining means for enabling a processor to define a subscription to the one or more tables, executing means for enabling a processor to execute a query on the source database, normalizing means for enabling a processor to normalize the query, determining means for enabling a processor to determine whether the query would cause semantically appropriate changes to the target database, and sending means for enabling a processor to send the normalized query to the target database for execution, if the determining means determines that the query would cause semantically appropriate changes to the target database.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
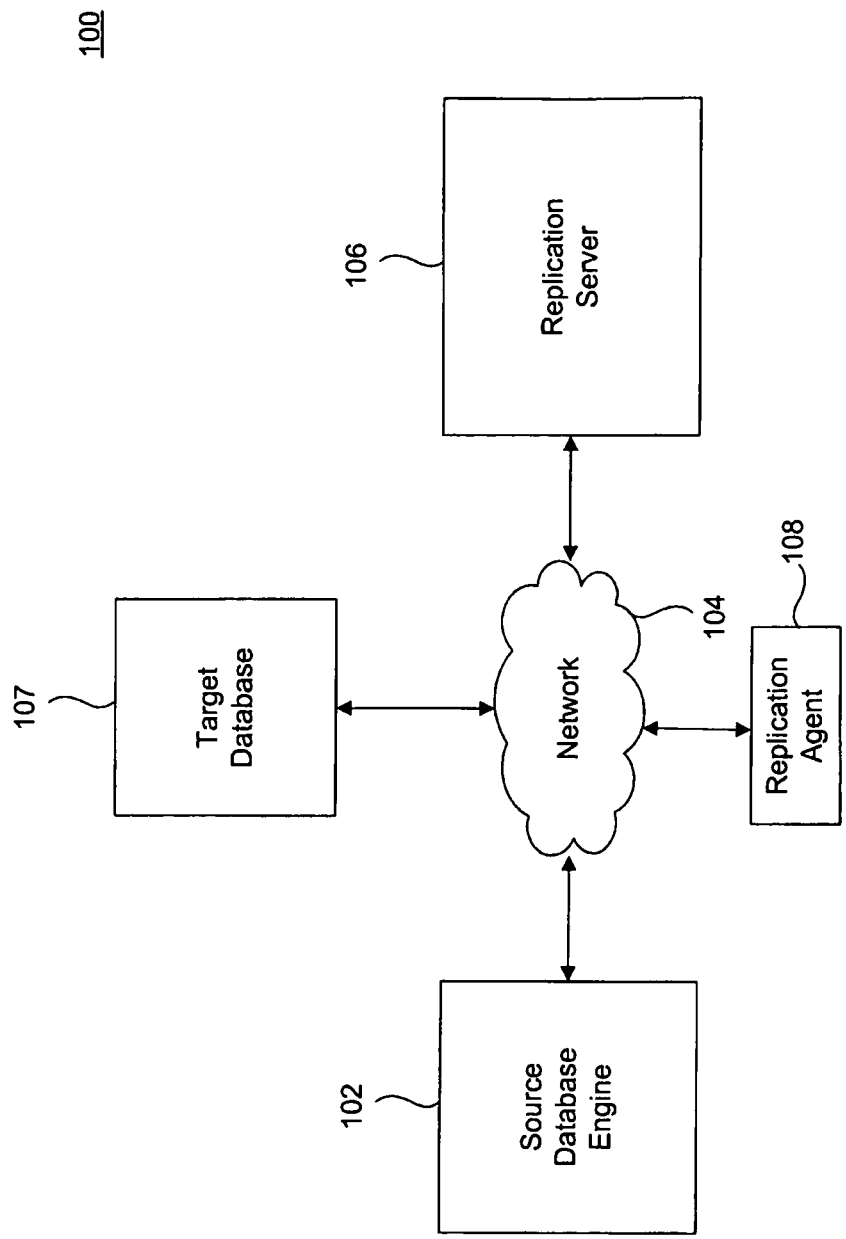
FIG. 1 illustrates a network in which the present invention, or portions thereof, can be implemented, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

One skilled in the relevant arts will further appreciate that the term query, as used throughout this specification, includes different types of commands executed on a database engine. In accordance with an embodiment of the present invention, the queries are data manipulation language ("DML") statements.

FIG. 1 is a network 100 in which the present invention, or portions thereof, can be implemented. A source database engine 102 is able to communicate over network 104 with replication server 106 via replication agent 108, in accordance with an embodiment of the present invention.

Network 104 can be any type of network or combination of networks such as, but not limited to, a local area network, wide area network, or the Internet. Network 104 may be any form of a wired network or a wireless network, or a combination thereof.

Also in communication over network 104 is a replication agent 108. The replication agent 108 facilitates the replication process by, in accordance with an embodiment of the present invention, scanning a transaction log for changes at source database engine 102 and sending those changes to replication server 106. One skilled in the relevant arts will further recognize that the network 100 can be configured in a number of ways in order to achieve the same result, and the aforementioned configuration is shown by way of example, and not limitation. For instance, in accordance with an embodiment of the present invention, replication agent 108 and source database engine 102 are located in a single physical computing device or cluster of computing devices.

Source database engine 102 comprises a source database and a transaction log, in accordance with an embodiment of the present invention. In accordance with a further embodiment of the present invention, the source database is mirrored ("replicated"), in whole or in part, to a target database 107 by replication server 106. In a traditional log-based replication system, changes to the source database are sent to replication server 106 over network 104, which then applies these changes, over network 104, directly to target database 107. In accordance with an embodiment of the present invention, statements corresponding to the original queries executed on source database engine 102 which caused the changes to the database of source database engine 102 are written to a transaction log, which is then read by replication agent 108 and forwarded to replication server 106 for application to target database 107. In accordance with a further embodiment of the present invention, replication agent 108 formats the contents read from the transaction log using a different structure language, and then forwards the formatted contents to replication server 106. In accordance with an additional embodiment of the present invention, the choice of whether to utilize traditional log-based replication or query statement replication is optimized, allowing the use of either replication method as needed. Further detail regarding statement logging is found in co-pending, commonly-owned U.S. patent application Ser. No. 12/183,843, titled "Statement Logging in Databases", which is herein fully incorporated by reference.

This optimization, as well as further detail regarding query statement replication, is discussed further herein.

II. Replication Subscription

The replication server 106 of FIG. 1 can be used to replicate the entire source database, or only a portion thereof. In accordance with an embodiment of the present invention, the replication agent 108 selectively reads and forwards modifications performed on the source database, and recorded in a transaction log, to the replication server 106. In accordance with a further embodiment of the present invention, replication agent 108 forwards the modifications by formatting data read from the transaction log into a structure language, and forwarding the formatted data. Replication server 106 replicates the modifications performed on the source database through the use of data publication and subscription.

Figure 2:
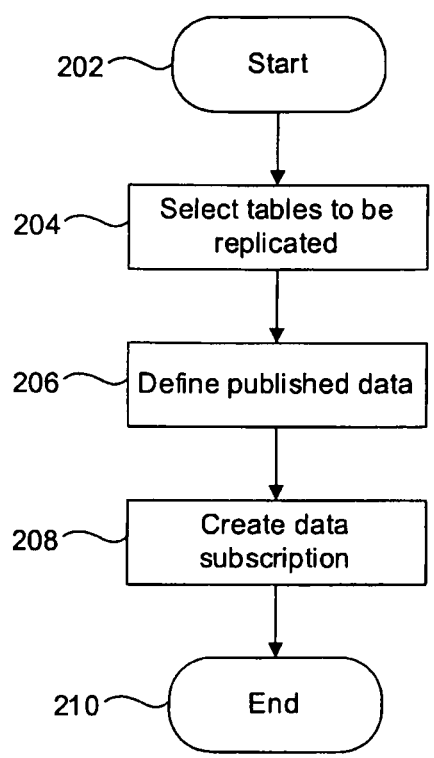
FIG. 2 is a flowchart illustrating steps by which data publications and subscriptions are defined, in accordance with an embodiment of the present invention.

FIG. 2 is a flowchart 200 illustrating steps by which data publications and subscriptions are defined, in accordance with an embodiment of the present invention. The method begins at step 202 and continues to step 204 where tables of the source database of source database engine 102 are selected for replication, in accordance with an embodiment of the present invention. As previously noted, the tables selected for replication may be any number of tables, from a single table to every table in the source database. The tables selected for replication further include, in accordance with an embodiment of the present invention, tables to be created in the future. In accordance with an embodiment of the present invention, the selection of tables available for replication is accomplished through the configuration of source database engine 102. When a table in the source database is selected for replication, source database engine 102 will log table changes suitable for replication, in accordance with an embodiment of the present invention. In accordance with a further embodiment of the present invention, selecting a table for replication at source database engine 102 informs replication agent 108 that logged changes to the selected tables should be sent to replication server 106.

At step 206, a publication scheme, or replication definition, for the tables selected for replication is defined, in accordance with an embodiment of the present invention. For example, for a source table T selected for replication, the source table having two columns A and B, where the values of column A are integers and the values of column B are floating point values, table T could be published as a table with a single column of integers, wherein the single column maps to column A of table T. As an additional example, a publication scheme can define a transformation, such that table T can be published such that all values associated with columns A and B are of floating point type. In accordance with an embodiment of the present invention, the publication scheme is defined at replication server 106.

By applying a publication scheme that identifies predicate conditions for replicating data, it is possible to control exactly what data from a source table in a source database is replicated at a target database, such as target database 107. One skilled in the relevant arts will recognize that the step of adding such predicates is optional, and that no predicates are used in an embodiment where replication server 106 is configured to replicate an entire table from the source database to target database 107. For example, if an exact copy of source table T is to be made at target database 107, it is necessary for the source database engine 102 to publish the entire source table T without predicates.

A data subscription is then created at step 208, in accordance with an embodiment of the present invention. The data subscription defines, similarly through the use of predicate conditions, what data from a published table replication server 106 requests for replication to target database 107. For example, if replication server 106 needs data from published table T only where the values of column A are greater than 100, then a subscription is defined for table T where A>100. If the entire source table from the source database is to be mirrored to target database 107, then the subscription is defined without any predicates, in accordance with an embodiment of the present invention. In accordance with a further embodiment of the present invention, the data subscription is defined at replication server 106.

Additionally, at the time of the creation of the data subscription at step 208, in accordance with an embodiment of the present invention, replication server 106 determines whether, based on the parameters of the data subscription, it would be computationally preferable and semantically correct to use statement replication instead of propagation of atomic changes. In accordance with an additional embodiment of the present invention, the determination for whether to use statement replication or propagation of atomic changes is made when a data publication scheme is defined. One skilled in the relevant arts will appreciate that the determination for whether to use statement replication or propagation of atomic changes may be made at a number of different intervals in the operation, and the aforementioned intervals are provided by way of example, and not limitation. Replication server 106 will then apply statement replication, if computationally preferable and semantically correct, or will otherwise use atomic changes, in accordance with an embodiment of the present invention.

III. Replication of Subscribed Data

Figure 3:
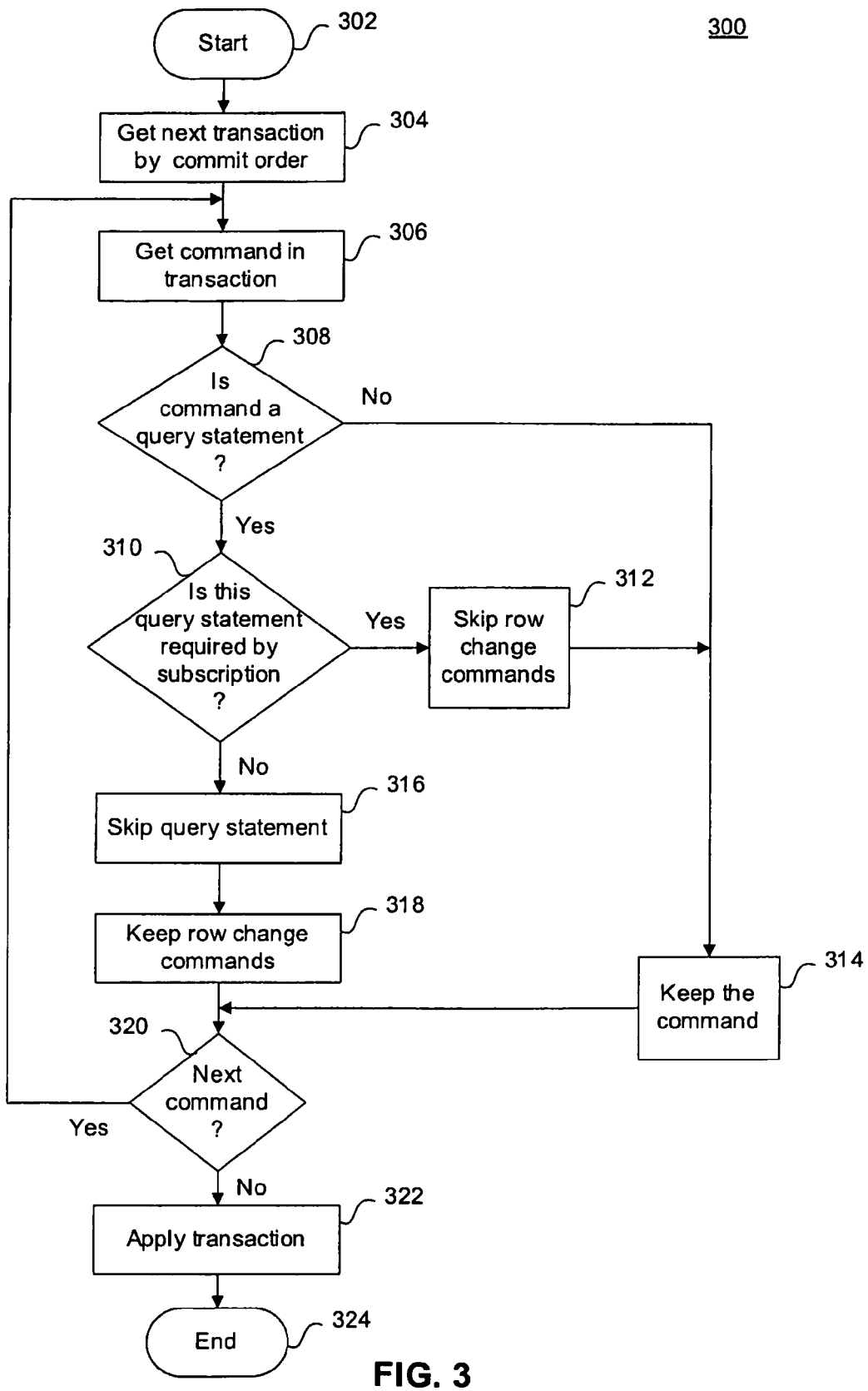
FIG. 3 is a flowchart illustrating steps by which a replication server facilitates the replication of subscribed data, in accordance with an embodiment of the present invention.

FIG. 3 is a flowchart 300 illustrating steps by which a replication server, such as replication server 106 in FIG. 1, facilitates the replication of subscribed data, in accordance with an embodiment of the present invention. Prior to the replicating process of flowchart 300, one or more queries, as part of one or more transactions, are executed on source database engine 102, resulting in the need to replicate the changes caused by these queries on target database 107. The method starts at step 302 and proceeds to step 304 where the next transaction based on commit order is identified and retrieved.

At step 306, a command in the transaction retrieved at step 304 is analyzed, in accordance with an embodiment of the present invention. In accordance with a further embodiment of the present invention, the command analyzed at step 306 is the first command of the transaction during the first iteration of step 306, and subsequent commands of the transaction during subsequent iterations of step 306.

Next, it is determined whether the command is a query statement at step 308, in accordance with an embodiment of the present invention. In accordance with a further embodiment of the present invention, non-query commands which represent atomic row changes are kept at step 314, allowing them to be directly applied by replication server 106 to target database 107.

If the command is a query statement, the method proceeds to step 310 where it is determined whether the query statement is required by a subscription at replication server 106, in accordance with an embodiment of the present invention. If the query statement is required by a subscription, then atomic row change commands associated with the query statement are skipped at step 312, and the query statement command itself is retained at step 314. This ensures that the query statement is applied by replication server 106 to target database 107, but that the individual changes that the query statement command performed on the source database of source database engine 102 are not retained for application by replication server 106 to target database 107, in accordance with an embodiment of the present invention.

If the query statement is not required by a subscription, then the method proceeds to step 316 where the query statement is skipped, and to step 318, where the atomic row change commands are retained. This ensures that the query statement is not applied by replication server 106 to target database 107, but that the individual changes that the query statement command performed on the source database of source database engine 102 are retained for application by replication server 106 to target database 107, in accordance with an embodiment of the present invention.

In accordance with an additional embodiment of the present invention, at step 310 the categorization of the query statement is determined, and the method proceeds to step 312 if the categorization corresponds to a query statement that can be replicated, and to step 316 if the categorization corresponds to a query statement that cannot be replicated.

In accordance with a further embodiment of the present invention, at step 310 a determination is made as to whether the query statement has undergone any data transformations and, if so, whether the query statement can be processed by the replication server 106. If the query statement can be processed by the replication server 106, then the method proceeds to step 312, or to step 316 otherwise.

In accordance with another embodiment of the present invention, if at step 310 a determination is made that the query cannot be replicated, a further determination is made as to whether the query can be transformed in a manner such that it can be correctly processed by the replication server 106. If so, then the method proceeds to step 312 using the transformed query, or to step 316 otherwise. By way of example, and not limitation, if there is a subscription to the rows of a table T where the values a column i of table T are greater than 100, and a query to delete table T is received, then the delete query may be replicated by transforming the query to, for example, "delete T where i>100". One skilled in the relevant arts will appreciate that additional such transformations are possible in order to allow a query to be replicated, and the aforementioned transformation is provided by way of example, and not limitation.

One skilled in the relevant arts will appreciate that additional methods of determining whether a query statement itself should be processed, or if the atomic row changes are needed, and that these methods can be used to supplement or substitute those of step 310, and the aforementioned methods are provided by way of example, and not limitation.

At step 320, if there are additional commands to be processed in the transaction then the method returns to step 306, otherwise the method proceeds to step 322 where the commands associated with the transaction that were retained at steps 314 and 318 are applied by replication server 106 to target database 107, in accordance with an embodiment of the present invention. The method ends at step 324.

Figure 4:
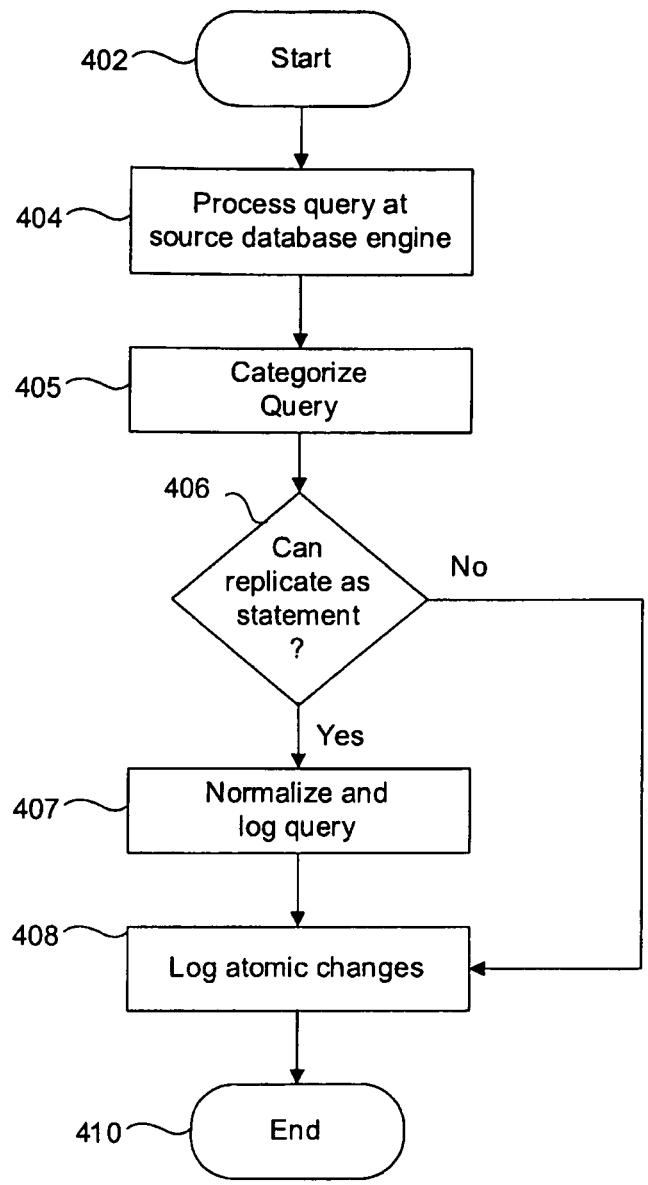
FIG. 4 is a flowchart illustrating the steps for facilitating replication at a source database engine, in accordance with an embodiment of the present invention.

FIG. 4 is a flowchart 400 illustrating the steps for facilitating replication at a source database engine 102, in accordance with an embodiment of the present invention. The method begins at step 402 and continues to step 404 where a query is executed at source database engine 102. The query is categorized at step 405. Further detail regarding statement categorization and normalization is found in co-pending, commonly-owned U.S. patent application Ser. No. 12/183,794, titled "Statement Categorization and Normalization", which is herein fully incorporated by reference.

At step 406, it is determined whether the query statement can be replicated and, if so, the query is normalized and logged at step 407, in accordance with an embodiment of the present invention. If the query statement cannot be replicated, the method proceeds directly to step 408.

At step 408, source database engine 102 logs change data for facilitating traditional log-based replication. With both the normalized query of step 407 and the change data of step 408, replication server 106 is able to select the optimal data for its replication process. The method ends at step 410.

IV. Exemplary Replication Server Configurations

The following exemplary replication server configurations illustrate possible uses for the replication process disclosed herein, although one skilled in the relevant arts will appreciate that many additional configurations exist. In several examples, a database acting as a primary site for a subset of data in a table will publish that data for replication, and a database acting as a replicated site for that same subset of data will subscribe to only that data, in accordance with an embodiment of the present invention. Selecting data subsets for publication and subscription is accomplished, in accordance with an embodiment of the present invention, through the use of predicates, which are further detailed in Section II, supra.

Figure 5:
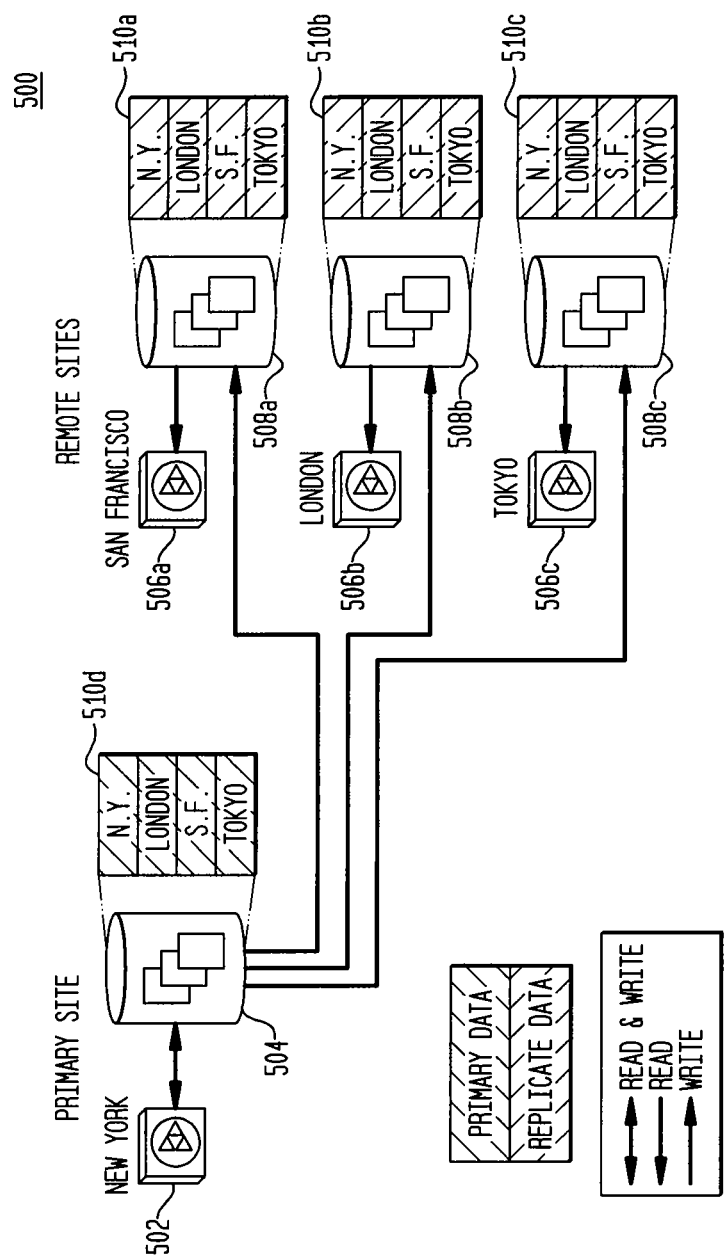
FIGS. 5-9 illustrate exemplary replication networks, in accordance with embodiments of the present invention.

FIG. 5 illustrates a replication network 500, in accordance with an embodiment of the present invention. A client network 502 located in New York interfaces with database 504, in an example implementation. Database 504 comprises, among other objects, table 510*d* with data associated with different remote sites such as, for example, New York, London, San Francisco, and Tokyo, in accordance with an embodiment of the present invention. In this example, database 504 contains the primary copy of table 510*d*.

The various remote client sites, such as San Francisco 506*a*, London 506*b*, and Tokyo 506*c*, each have their own databases, 508*a*-508*c*, respectively. Databases 508*a*-508*c* are entire copies of the primary site database 504.

With attention to remote site 506*a*, having database 508*a*, the configuration of database 508*a* for replication is further discussed. Database 508*a* is configured to subscribe to table 510*d* of database 504 for replication. When this subscription is created, database 508*a* determines an operationally acceptable replication method. Since an exact copy of database 504 will be maintained by database 508*a*, it is likely operationally acceptable to use query statement replication. Accordingly, when a query is processed by database 504, the query is categorized and normalized, sent to a replication server associated with database 508*a*, and the query is applied directly to database 508*a*, in accordance with an embodiment of the present invention.

Figure 6:
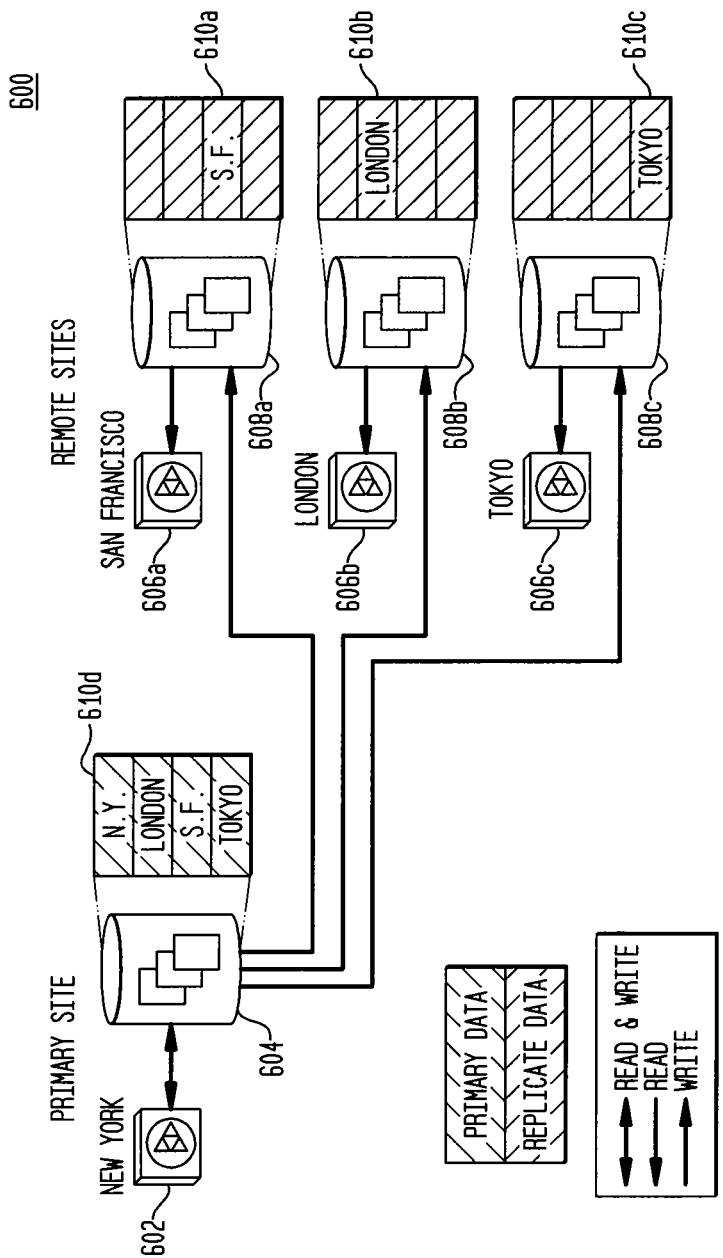

FIG. 6 illustrates a replication network 600, in accordance with an embodiment of the present invention. In this example, database 608*a* is subscribed to only a subset of the data of table 610*d*, which corresponds to data associated with the San Francisco remote site. This configuration may be optimal in the situation where clients 606*a*, located in direct communication with database 608*a*, only require access to the data of table 610*d* that relates to San Francisco, and therefore need a local replicated copy of this portion of table 610*d*. As before, a subscription to database 604 is created at database 608*a*, but in this case a "where" clause is introduced into any query such that only data related to San Francisco is replicated to database 608*a*. In accordance with an embodiment of the present invention, atomic row changes would be replicated instead of the query statements.

Figure 7:
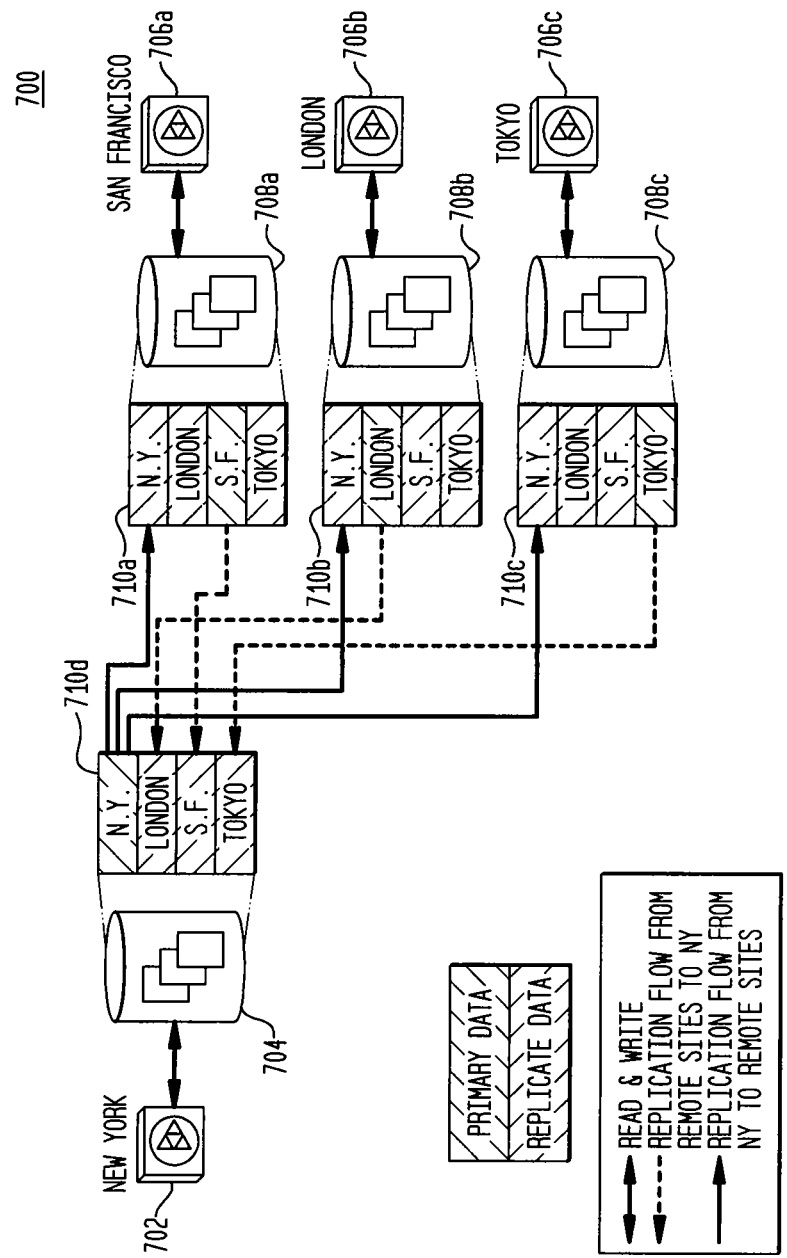

FIG. 7 illustrates a replication network 700, in accordance with an embodiment of the present invention. In this example, database 704 contains primary data for table 710*d* for all data related to New York, and contains replicated data for all other data. Table 710*a* of database 708*a* contains primary data relating to San Francisco, and replicated data for all other data, in accordance with an embodiment of the present invention, and similar configurations are used in tables 710*b* and 710*c* of databases 708*b* and 708*c*, respectively. This configuration is accomplished by creating subscriptions to each of the appropriate source data rows in each of the databases 704 and 708*a*-708*c*, in accordance with an embodiment of the present invention. For example, a subscription is created in the replication server of database 704 to the rows of table 710*a* of database 708*a* relating to San Francisco, in order to enable database 704 to have a replicated copy of the data for which database 708*a* is the primary database. Likewise, database 708*a* has a subscription to the rows of table 710*d* of database 704 relating to New York, in order to enable database 708*a* to have a replicated copy of the data for which database 704 is the primary database.

Figure 8:
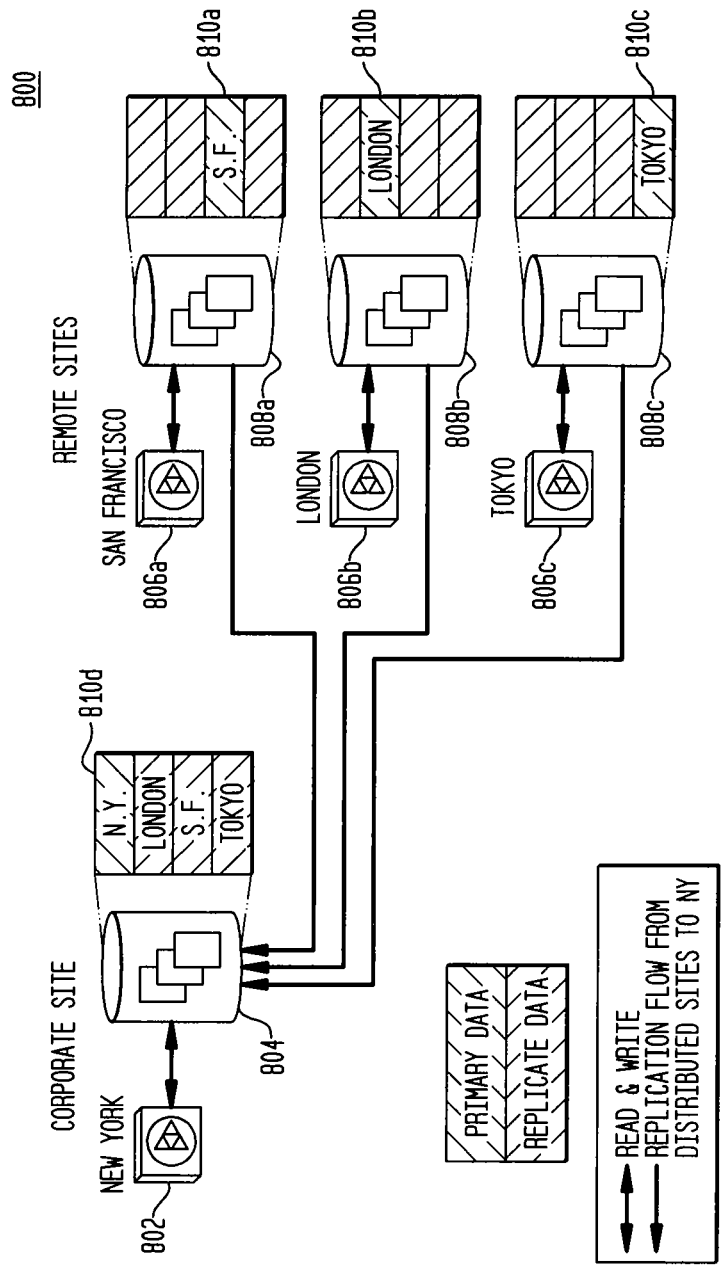

FIG. 8 illustrates a replication network 800, in accordance with an embodiment of the present invention. In this example, each of remote databases 808*a*-808*c* act as the primary databases for only the subset of data of tables 810*a*, 810*b*, and 810*c*, respectively, that relate to the remote site in question, and no replication subscriptions to any data located elsewhere. However, database 804 is subscribed to each of tables 810*a*, 810*b*, and 810*c*, which enables a complete view of all of the data from databases 808*a*-808*c*, as well as the data for which database 804 is the primary database, within a single table 810*d*, in accordance with an embodiment of the present invention.

Figure 9:
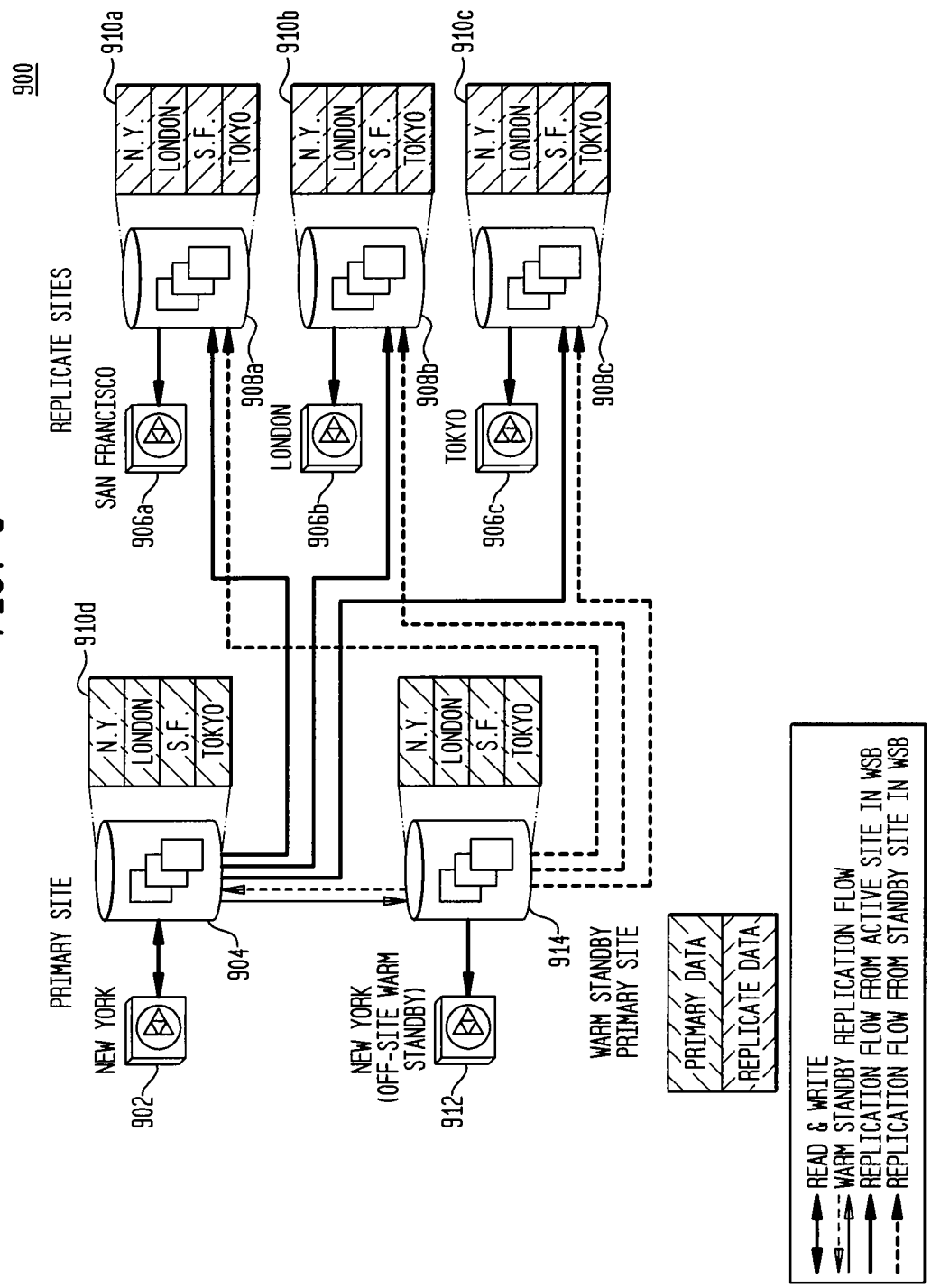

FIG. 9 illustrates a replication network 900, in accordance with an embodiment of the present invention. In this example, each of remote databases 908*a*-908*c* is subscribed to the entire table 910*d* of database 904. Additionally, a warm standby 914 is kept as an exact mirror of table 910*d* of database 904. When using a mixed configuration of warm standby and replicated databases, both replication modes are sent, in accordance with an embodiment of the present invention. Query statement replication is used to replicate data from active database 904 to warm standby database 914, whereas atomic row change replication is used to replicate data to databases 908*a*-908*c*, since it is not possible to ensure that the same dataset would be affected if query statement replication was used, in accordance with an embodiment of the present invention.

IV. Example Computer System Implementation

Figure 10:
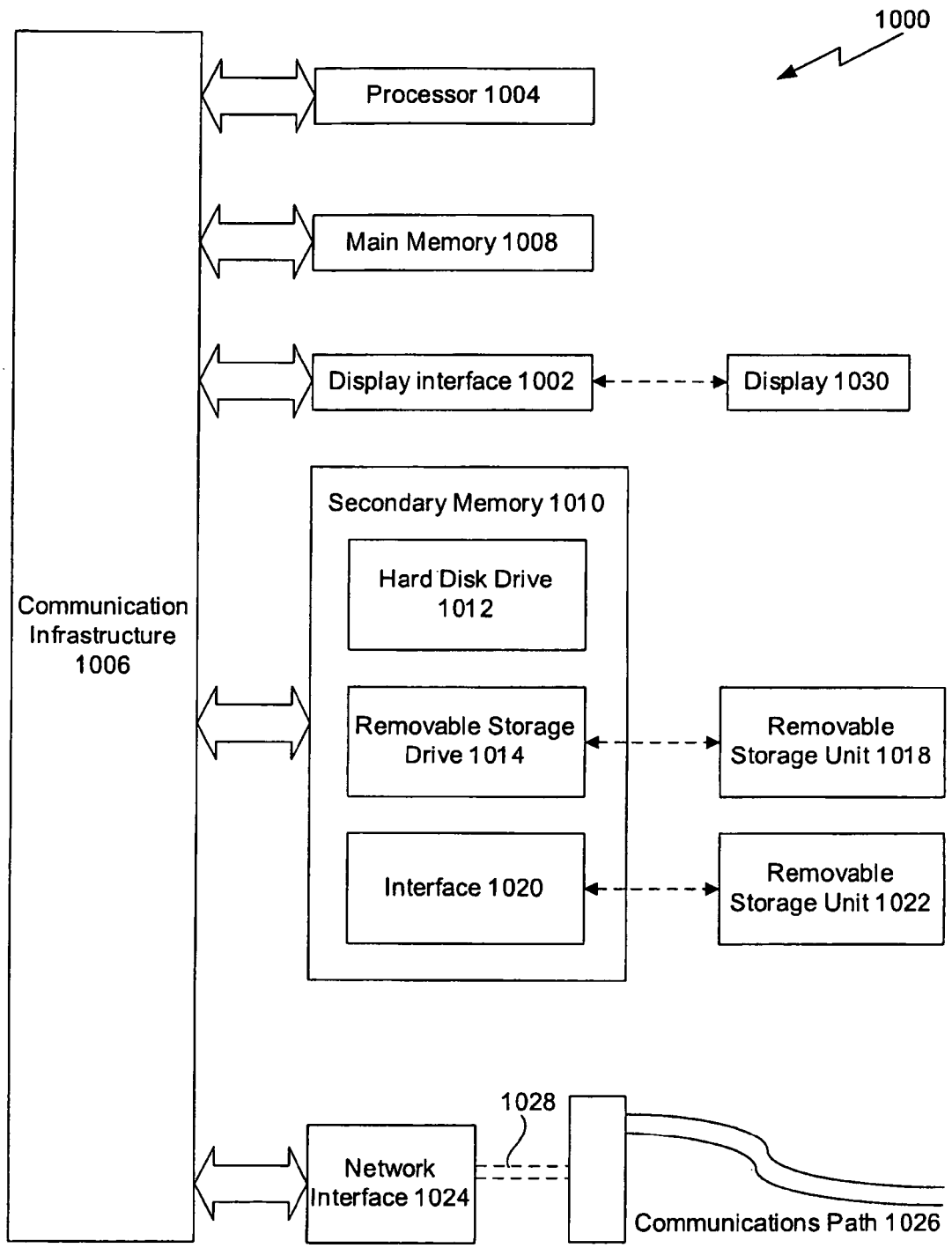
FIG. 10 depicts an example computer system in which embodiments of the present invention may be implemented.

Various aspects of the present invention can be implemented by software, firmware, hardware, or a combination thereof. FIG. 10 illustrates an example computer system 1000 in which the present invention, or portions thereof, can be implemented as computer-readable code. For example, the methods illustrated by flowcharts 200 of FIG. 2, 300 of FIG. 3 and 400 of FIG. 4, can be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general purpose processor. Processor 1004 is connected to a communication infrastructure 1006 (for example, a bus or network).

Computer system 1000 also includes a main memory 1008, preferably random access memory (RAM), and may also include a secondary memory 1010. Secondary memory 1010 may include, for example, a hard disk drive 1012, a removable storage drive 1014, and/or a memory stick. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Signals carried over communications path 1026 can also embody the logic described herein. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowcharts 200 of FIG. 2, 300 of FIG. 3 and 400 of FIG. 4, discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012 or communications interface 1024.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for replicating a table in a source database to a target database, comprising:
    defining a subscription for replicating data from the table in the source database to the target database;
    normalizing a query executed on the source database;
    determining, based on parameters of the subscription, that the normalized query would cause changes to the target database that are semantically correct by comparison to changes made to the source database by the query executed on the source database;
    determining that sending the normalized query to the target database is computationally preferable to propagation of log-based replication change data; and
    sending the normalized query to the target database for execution responsive to the determinations that the sending is computationally preferable and that the changes would be semantically correct.

2. The method of claim 1, further comprising:

sending the change data, the change data comprising atomic changes, to the target database for execution based on a determination that the normalized query would not cause changes to the target database that are semantically correct relative to changes made to the source database by the query executed on the source database.

3. The method of claim 1, wherein determining whether the normalized query would cause semantically correct changes to the target database is performed when the subscription is defined.

4. The method of claim 1, wherein sending the normalized query comprises sending the normalized query as part of a transaction log.

5. The method of claim 4, wherein the transaction log comprises one or more transactions, the normalized query associated with one of the one or more transactions.

6. The method of claim 5, wherein the target database processes the transaction log by processing the one or more transactions in commit order.

7. A system for replicating a table in a source database to a target database, comprising:

a defining module configured to define a subscription for replicating data from the table in the source database to the target database;

a normalizing module configured to normalize a query executed on the source database;

a determining module configured to determine, based on parameters of the subscription, that the normalized query would cause changes to the target database that are semantically correct by comparison to changes made to the source database by the query executed on the source database, and configured to determine that sending the normalized query to the target database is computationally preferable to propagation of log-based replication change data; and a sending module configured to send the normalized query to the target database for execution responsive to the determinations that the sending is computationally preferable and that the changes would be semantically correct.

8. The system of claim 7, wherein the sending module is further configured to send the change data, the change data comprising atomic changes, to the target database for execution based on a determination that the normalized query would not cause changes to the target database that are semantically correct relative to changes made to the source database by the query executed on the source database.

9. The system of claim 7, wherein determining whether the normalized query would cause semantically correct changes to the target database is performed when the subscription is defined.

10. The system of claim 7, wherein the sending module is further configured to send the normalized query as part of a transaction log.

11. The system of claim 10, wherein the transaction log comprises one or more transactions, the normalized query associated with one of the one or more transactions.

12. The system of claim 11, wherein the target database processes the transaction log by processing the one or more transactions in commit order.

13. A computer-usable medium having computer program logic recorded thereon for replicating a table in a source database to a target database, execution of which, by a computing device, causes the computing device to perform operations comprising:

defining a subscription for replicating data from the table in the source database to the target database;

normalizing a query executed on the source database;

determining, based on parameters of the subscription, that the normalized query would cause changes to the target database that are semantically correct by comparison to changes made to the source database by the query executed on the source database;

determining that sending the normalized query to the target database is computationally preferable to propagation of log-based replication change data; and sending the normalized query to the target database for execution responsive to the determinations that the sending is computationally preferable and that the changes would be semantically correct.

14. The computer-usable medium of claim 13, the operations further comprising:

sending the change data, the change data comprising atomic changes, to the target database for execution based on a determination that the normalized query would not cause changes to the target database that are semantically correct relative to changes made to the source database by the query executed on the source database.

15. The computer-usable medium of claim 13, wherein determining whether the normalized query would cause semantically correct changes to the target database is performed when the subscription is defined.

16. The computer-usable medium of claim 13, wherein sending the normalized query comprises sending the normalized query as part of a transaction log.

17. The computer-usable medium of claim 16, wherein the transaction log comprises one or more transactions, the normalized query associated with one of the one or more transactions.

18. The computer-usable medium of claim 17, wherein the target database processes the transaction log by processing the one or more transactions in commit order.

19. The method of claim 1, further comprising:

sending change data, the change data comprising atomic changes, to the target database for execution based on a determination that usage of the change data would be less computationally expensive than usage of the normalized query by the target database.

20. The system of claim 7, wherein the sending module is further configured to send change data, the change data comprising atomic changes, to the target database for execution based on a determination that usage of the change data would be less computationally expensive than usage of the normalized query by the target database.

21. The computer-usable medium of claim 13, the operations further comprising:

sending change data, the change data comprising atomic changes, to the target database for execution based on a determination that usage of the change data would be less computationally expensive than usage of the normalized query by the target database.

* * * * *